Patented Feb. 20, 1945

2,369,766

UNITED STATES PATENT OFFICE 2,369,766

PAPER-COATING COMPOSITION AND METHOD OF MAKING SAME

George Witty, New York, N. Y.

No Drawing. Application May 12, 1942,
Serial No. 442,727

2 Claims. (Cl. 106—157)

This invention relates to a new and improved flexible and transparent paper coating composition and more particularly to a coating adapted for coating paper, paper goods and food containers intended to be used for food substance and protect same from chemical reaction or adulteration.

The object of this invention is to provide a new and improved water-proofing and grease-proofing coating for paper and similar materials adapted to be applied to the surface of paper which prevents the passage of moisture and grease through that paper and leaves the treated surface suitable for print.

Another object of this invention is to provide a paper coating composition which is economical to manufacture which may be applied in any well known manner and which is entirely efficient for its purpose.

Still another object of this invention is to provide a composition so constituted that it will be flexible, non-tacky, transparent, highly moisture and grease resistant, which is odorless and colorless and free from being toxic or narcotic.

Other objects of this invention will be apparent from the hereunto appended claims and the detailed description of the processes and products hereinbelow.

Paper coating compositions have already been known for some years, and their methods of manufacture have become more or less standardized. However, it has been found that such coatings are lacking in stability and keeping qualities, despite the facts that various preservatives have been added to the coating to prevent deterioration, but to the present date these attempts more or less have failed to produce the results sought. The main difficulty with such coatings is that they tend to become thinner with age, the solids precipitate to the bottom in a very hard condition which cannot be brought back to their original condition by stirring and mixing, because of the fact that the vehicle that is in the solution has lost its viscosity and is no longer able to retain the solids in suspension.

One of the primary objects of the present invention is, therefore, to overcome the tendency of the milk albumin to deteriorate and lose its viscosity and this is accomplished mainly by the use of a stabilizing agent such as sodium stannate. The scrap leather solution will act as a plasticizer and will impart to the composition plasticity, better flowability and enhanced brushing properties, and when dry is more resistant to wetting and washing.

A further advantage of a coating made in accordance with the present invention resides in the fact that it has better uniformity, better flowability and enhanced covering properties, it may be applied by brush, spray or rollers, and which when dry is more resistant to wetting and washing.

In conclusion, it may be stated that the paper coating composition, made in accordance with the present invention consists of a vehicle and mineral matter in the form of fillers and pigments.

By the term pigments the inventor intended to cover colored as well as white pigments such as zinc oxide, barium sulfate, barite, feldspar, kaolin and the like. Carbon black, ultramarine blue as well as organic pigments of any types such as toners and lakes, may be employed, depending upon the color desired in the coating.

In the solution prepared in accordance with this invention the following ingredients are incorporated in the proportions indicated. All the parts are by weight:

| | Parts |
|---|---|
| Milk albumin | 50 |
| Potato starch | 25 |
| Kaolin | 5 |
| Borax | 2 |
| Sodium stannate | 2 |
| Nitrobenzene | 1 |
| Glucose | 5 |
| Scrap leather solution | 5 |

The milk albumin is added slowly to 150 parts of water until dissolved, and the borax and sodium stannate are then added to the albumin solution thoroughly stirred for a sufficient time until a smooth mixture results.

In a separate container the starch nitrobenzene and glucose are likewise dissolved in about 30 parts of hot water and then added to the albumin solution and the mixing continued, while heating the mixture gradually to about 100 to 150° F. the mixing is continued at the stated temperature until a smooth flowable solution results.

The kaolin thinned by water is used to give the solution body and paper slippage.

The leather scraps solution performs the function of closing the pores of the paper and resist the passage of moisture and grease. Its presence aids the folding and flexibility of the paper. A gallon of the scrap leather solution is made as follows, 1 pound of scrap leather is softened in 7 pounds of water, the soaking is facilitated by adding 4 ounces urea, 4 ounces ethylene glycol and 4 ounces phenol.

After the leather has been softened it is brought to a gummy state by boiling, after the boiling operation the solution is cooled and strained. Five parts of this solution are then added to the milk albumin and starch solution thoroughly mixed by agitation, the solution is filtered and placed in containers ready for use.

If necessary or desirable the coated articles can be further treated with a formaldehyde solution to further harden and increase the insolubility of the coating, said formaldehyde solution preferably consisting of 2 parts of 40% formaldehyde and 5 parts of water.

Instead of milk albumin, animal glue, gelatine or Irish moss may be used. The potato starch can be replaced by rice or corn starch, the glucose may be replaced by glycerine or other hygroscopic agent. Instead of kaolin, calcium sulfate, barium sulfate or bentonite may be used.

While I have described my invention in detail, I do not wish to limit my invention hereto or thereby as some of the ingredients mentioned may be omitted, other ingredients may be employed, changes may be made in the proportions of the ingredients and changes may also be made in the manner of compounding the ingredients all without departing from the spirit or principle of the invention.

Having fully described my invention what I claim as new and desire to secure by Letters Patent is:

1. A composition adapted for use in forming a paper coating solution consisting of 50 parts with milk albumin, 25 parts potato starch, 5 parts kaolin, 2 parts borax, 2 parts sodium stannate, 1 part nitrobenzene, 5 parts glucose and 5 parts scrap leather solution which is composed of water, urea, ethylene glycol and phenol, all the parts being by weight.

2. A method of preparing paper coating solution comprising mixing 50 parts milk albumin, 25 parts potato starch, 5 parts kaolin, 2 parts borax, 2 parts sodium stannate, 1 part nitrobenzene, 5 parts glucose and 5 parts scrap leather solution which is composed of water, urea, ethylene glycol and phenol, all the parts being by weight; the mixture being gradually heated at a temperature of 100 to 150° F. and continuing the stated temperature until a smooth, flowable solution results.

GEORGE WITTY.